United States Patent [19]
Rilling et al.

[11] Patent Number: 5,693,879
[45] Date of Patent: Dec. 2, 1997

[54] SENSOR CARRIER FOR A DEVICE FOR MEASURING THE MASS OF A FLOWING MEDIUM OF AN INTERNAL COMBUSTION ENGINE

[75] Inventors: Heinz Rilling, Eberdingen; Stefan Lehenberger, Maierhöfen, both of Germany

[73] Assignee: Robert Bosch GmbH, Stuttgart, Germany

[21] Appl. No.: 617,865

[22] PCT Filed: Jul. 6, 1995

[86] PCT No.: PCT/DE95/00880

§ 371 Date: May 22, 1996

§ 102(e) Date: May 22, 1996

[87] PCT Pub. No.: WO96/03622

PCT Pub. Date: Feb. 8, 1996

[30] Foreign Application Priority Data

Jul. 22, 1994 [DE] Germany ............... 44 26 102.0

[51] Int. Cl.$^6$ ........................................... G01F 1/68
[52] U.S. Cl. ................ 73/118.2; 73/204.22; 73/204.26
[58] Field of Search ................... 73/118.2, 204.22, 73/204.26, 202.5

[56] References Cited

U.S. PATENT DOCUMENTS

| | | | |
|---|---|---|---|
| 4,914,947 | 4/1990 | Davidson | 73/202.5 |
| 4,976,145 | 12/1990 | Kienzle et al. | 73/118.2 |

FOREIGN PATENT DOCUMENTS

| | | | |
|---|---|---|---|
| 4012080 | 10/1991 | Germany | 73/204.26 |
| 4219454 | 12/1993 | Germany | 73/204.22 |

*Primary Examiner*—Richard Chilcot
*Assistant Examiner*—Harshad Patel
*Attorney, Agent, or Firm*—Edwin E. Greigg; Ronald E. Greigg

[57] ABSTRACT

A device for measuring the mass of a flowing medium having a temperature-dependent sensor element, which is inserted flush in a recess of a sensor carrier and is retained therein by means of an adhesive. The sensor carrier is made by bending a thin metal strip and has two elements, a frame element and a retaining element, which together form a recess, into which the sensor element is inserted flush and glued by means of an adhesive to a plateaulike protuberance of a bottom face of the retaining element. The sensor carrier is intended for a device for measuring the mass of a flowing medium for measuring the flow rate or mass of the air aspirated by internal combustion engines.

9 Claims, 4 Drawing Sheets

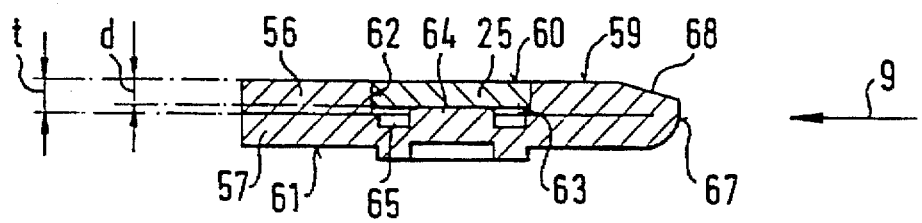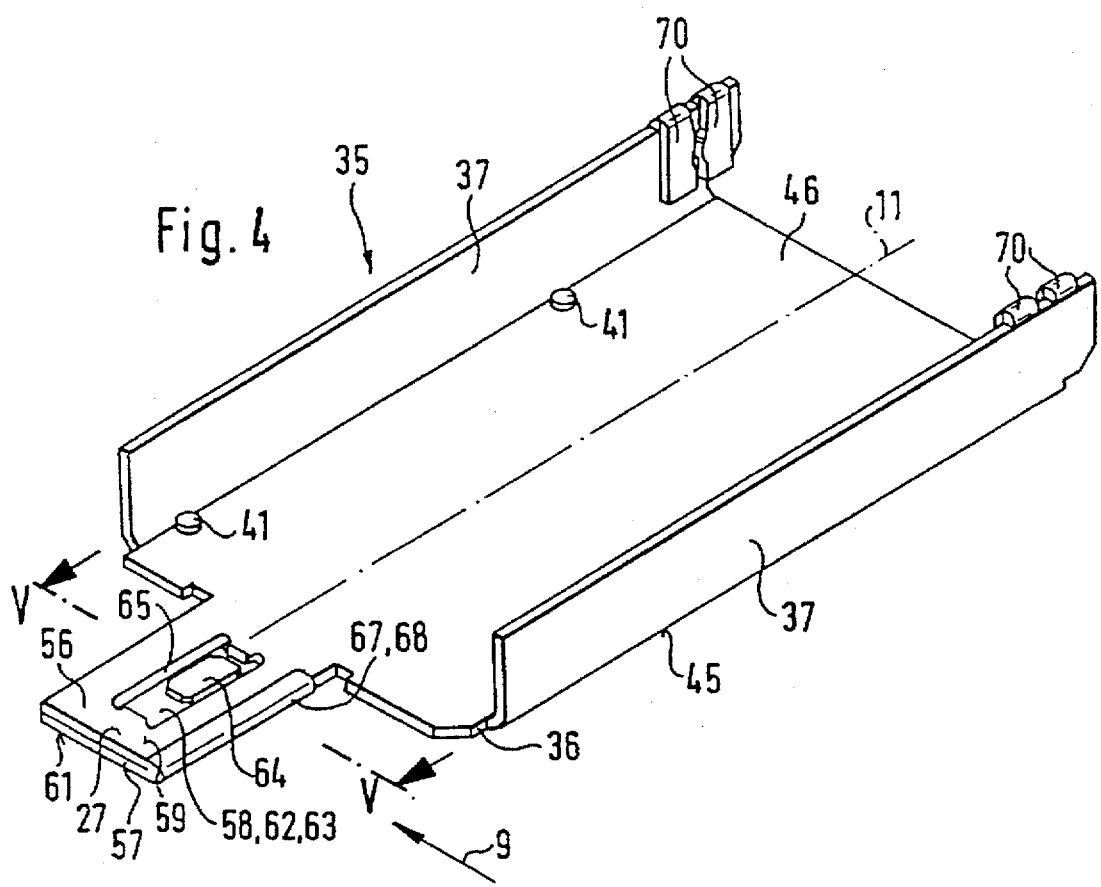

SENSOR CARRIER FOR A DEVICE FOR MEASURING THE MASS OF A FLOWING MEDIUM OF AN INTERNAL COMBUSTION ENGINE

BACKGROUND OF THE INVENTION

The invention is based on a sensor carrier for a device for measuring the mass, or flow rate, of a flowing medium, as set forth hereinafter. A sensor carrier for a device is already known (German Published Patent Disclosure DE-OS 38 44 354 now U.S. Pat. No. 4,976,145), in which a so-called hot-film sensor element is placed in a flowing medium and, to measure the flow rate of the flowing medium, has a temperature-dependent sensor region composed of individual resistor layers applied to a platelike substrate and including at least one heating resistor and at least one temperature-dependent measuring resistor. For retention purposes, the hot-film sensor element is glued by its underside partly to a tongue-like support element, so that the latter element is bathed by the flowing medium on its free end in a measurement conduit. For measurement, the measuring resistor is kept at an overtemperature that is far above the temperature of the flowing medium, so that substantially because of convection, it gives off a certain amount of heat to the flowing medium as a function of the mass or flow rate of the flowing medium moving past it. The heating resistor as is known serves to maintain the constant overtemperature of the measuring resistor and is disposed in the best possible thermal contact with the measuring resistor so as to keep the temperature of the latter resistor constant. The measuring resistor has a resistance that is dependent on the temperature, so that a change in the overtemperature causes a change in its resistance, and a closed-loop control circuit connected to the measuring resistor and the heating resistor is mistuned. The closed-loop control circuit is embodied for instance as a bridgelike resistance measuring circuit that upon being mistuned by the measuring resistor varies the heating current or heating voltage of the heating resistor, so as to keep the overtemperature of the measuring resistor constant; the heating current or heating voltage of the heating resistor required for maintaining the overtemperature of the measuring resistor is a standard for the mass of the flowing medium. As may be learned from the prior art referred to at the outset, the substrate has a further resistor, which will hereinafter be called the medium temperature resistor and which is disposed on the substrate; it is thermally decoupled from the heating resistor and the measuring resistor by means of slits made by removal of material from the substrate. The medium temperature resistor has a resistance that is dependent on the temperature and is part of the closed-loop control circuit that assures that changes in the temperature of the flowing medium do not affect the measurement accuracy of the device. To attain a precise outcome of measurement, the quantity of heat output by the heating resistor should be supplied as completely as possible to the measuring resistor, or in other words without some of it being dissipated to the support element, for instance via a layer of adhesive on the sensor element.

German Published Patent Disclosure DE-OS 42 19 454 shows a sensor carrier which is intended for retaining micromechanical sensor elements in particular and which has a recess in which the sensor element is placed flush and retained by means of a layer of adhesive applied to a bottom face of the recess. It is known that micromechanical sensors of so-called micromechanical design are made by etching out a semiconductor body, for instance a silicon wafer, with a membranelike sensor region created by the etching that has at least one heating resistor and at least one temperature-dependent measuring resistor. The membranelike sensor region defines only a small area of the sensor element and has an extremely slight thickness of a few micrometers, so that only a small surface area of the sensor region needs to be heated by the heating resistor in order to react, within a short response time, to changes in the mass of the flowing medium caused by changes in the amount of heat output by the heating resistor. When the device is produced, it is extraordinarily important that the sensor element be glued into the recess with its surface as flush as possible relative to the surface of the sensor carrier, because even the least offset, for instance from an unevenly applied layer of adhesive, causes eddies and regions of detachment, which especially at the surface of the sensor element affect heat dissipation of the measuring resistor disadvantageously and adulterate the outcome of measurement. Extreme care must therefore be taken when the sensor element is glued into the recess of the sensor carrier; thus particularly in mass production of the device, major manufacturing effort is needed, which involves considerable production costs.

ADVANTAGES OF THE INVENTION

The sensor carrier according to the invention and the method according to the invention, have the advantage over the prior art that the sensor element can be glued flush into the recess of the sensor carrier with the most extreme possible precision. It is advantageously possible by means of the sensor carrier according to the invention for virtually the entire amount of heat output by the measuring resistor to be supplied to the flowing medium, making it possible to achieve a precise outcome of measurement. It is especially advantageous that it is possible to produce the sensor carrier especially economically. By the provisions recited herein advantageous further features of and improvements to the sensor carrier are possible. Advantageously, the sensor carrier according to the invention enables stable retention of the sensor element, so that influence on the outcome of measurement, especially from vibration, can be precluded.

BRIEF DESCRIPTION OF THE DRAWINGS

An exemplary embodiment of the invention is shown in simplified fashion in the drawing and described in further detail in the ensuing description.

FIG. 4 is a perspective individual view of a bottom housing of the device with the sensor carrier according to the invention; and FIG. 5 is a section taken along a line V—V in FIG. 4.

DETAILED DESCRIPTION OF THE EXEMPLARY EMBODIMENT

Figure 1:
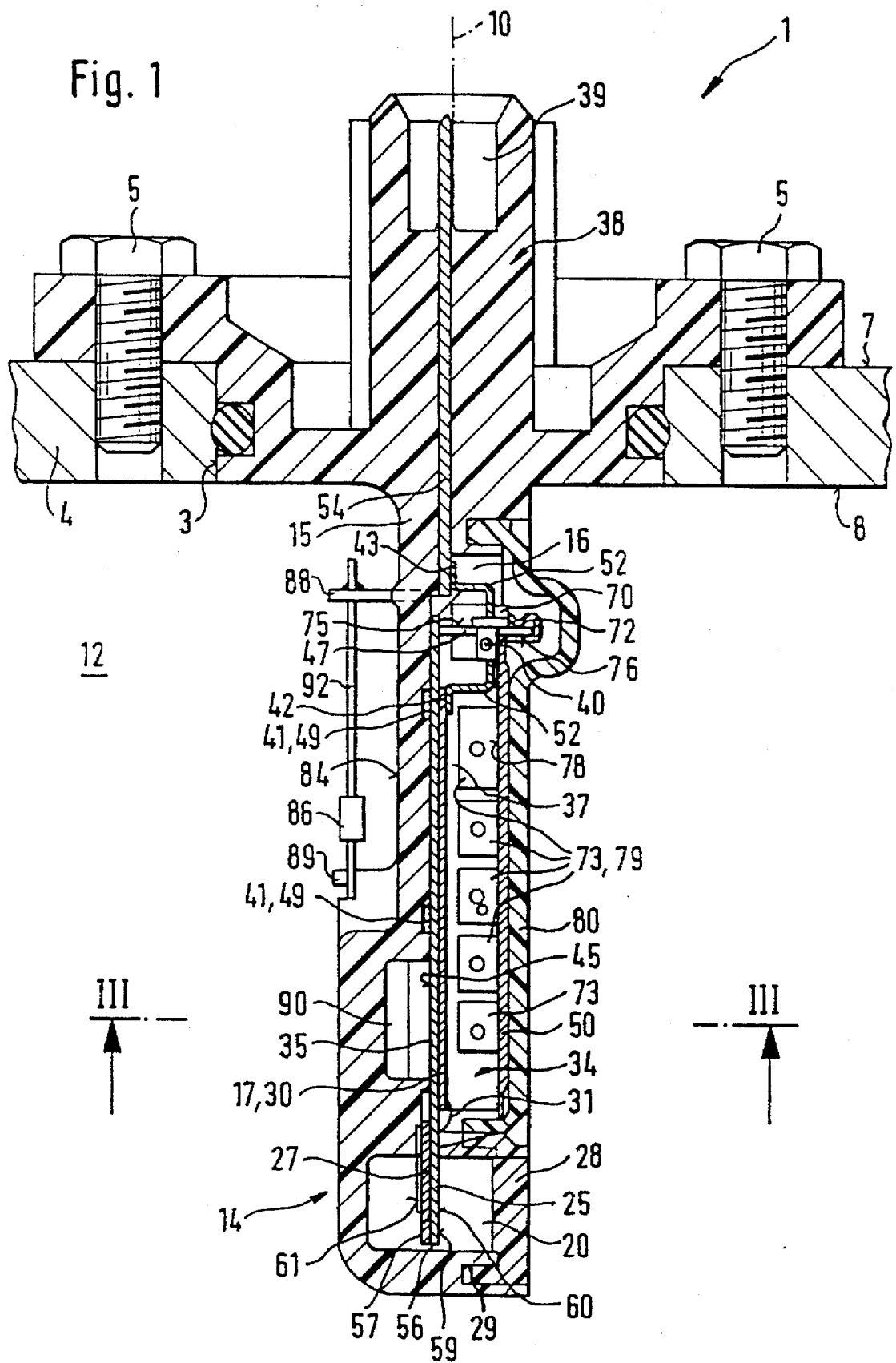
FIG. 1 in a cross sectional side view, shows a section through a device equipped with a sensor carrier according to the invention.

The device 1 according to the invention, shown in a side view in FIG. 1, is intended for measuring the mass or flow rate of a flowing medium, in particular the flow rate of aspirated air of an internal combustion engine not otherwise shown. The device 1 is preferably slender and cylindrical in form, extending along a longitudinal axis 10 that passes centrally through the device 1. The device 1 is passed through an opening 3 in a wall 4, for example of an intake tube, in which air aspirated by the engine from the environment flows. By means of two screw connections 5, the device 1 is secured in plug-in fashion to an outer surface 7 of the wall 4 that with an inner surface 8 defines a flow cross section 12, in which the medium flows at right angles to the plane of the drawing in FIG. 1 and on into the plane of the drawing. The device 1 has an elongated base housing 15 made of plastic, on whose free end region 14, a measurement conduit 20 is formed, which protrudes with an approximately rectangular cross section approximately into the middle of the flow cross section 12 and extends approximately parallel to the flow direction, so that the flowing medium flows through it. Accommodated inside the measurement conduit 20 in the direction of the longitudinal axis 10 is a sensor element 25, which has a platelike shape and is aligned with its largest surface 60 approximately parallel to the medium flowing into the plane of the drawing in FIG. 1. The flow direction of the medium is identified by corresponding arrows 9 in FIGS. 2–5, where it extends from right to left. The measurement conduit 20 is defined partly by the basic housing 15 and partly by a closure cap 28 that can be mounted on the basic housing 15 and for instance is made of plastic; the cap is insertable into a groove 29 provided on the end region 14 of the basic housing 15. The closure cap 28 is not shown in FIG. 2, for the sake of greater clarity.

Figure 2:
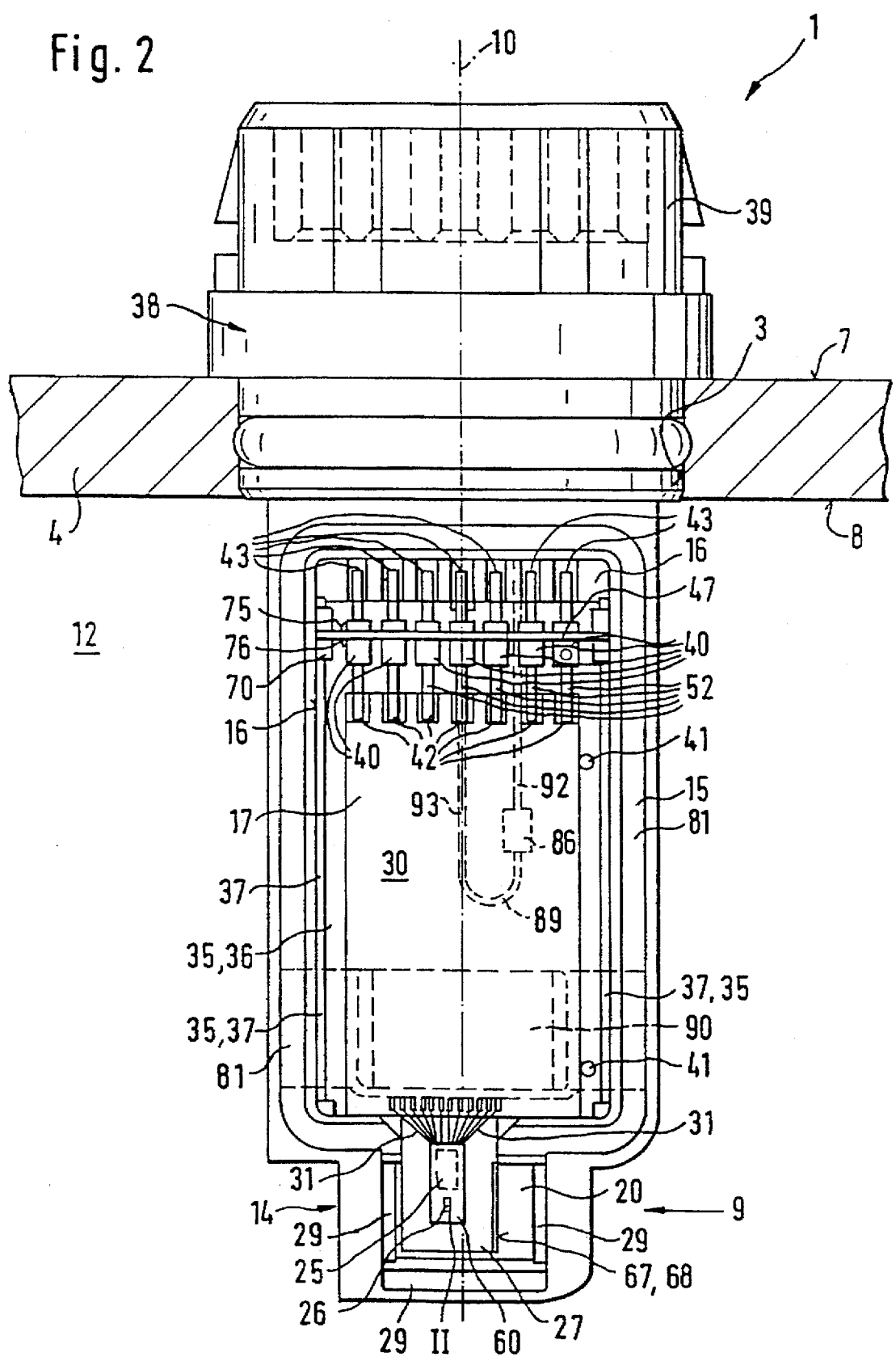
FIG. 2 shows a plan view of the device with the sensor carrier according to the invention.

The sensor element 25 can be produced by etching a semiconductor body, for instance a silicon wafer, in a so-called micromechanical design and has a structure that can be found for instance in German Patent Disclosure DE-OS 42 19 454 and is therefore not shown in further detail here. The sensor element 25 has a membranelike sensor region 26, likewise made by being etched out, which as shown in FIG. 2, in a plan view of the device 1, is defined by a drawn-in line II. The sensor region 26 has a thickness of only a few micrometers and has a plurality of resistor layers, also made by being etched out, which form at least one temperature-dependent measuring resistor and for example at least one heating resistor. It is also possible for the sensor element 25 to be provided in the form of a so-called hot-film sensor element, whose structure can be learned for instance from published German Patent Disclosure DE-OS 36 38 138 now U.S. Pat. No. 4,777,820. Hot-film sensor elements of this kind also have individual resistor layers, applied to a platelike substrate, that include at least one temperature-dependent measuring resistor and by way of example at least one heating resistor.

Between the measurement conduit 20 and a connection part 38 of the device 1, which part is located on the other end of the basic housing 15 outside the flow cross section 12, an electronic closed-loop control circuit 30 is accommodated in a recess 16 in the basic housing; as shown in FIG. 2, this circuit is electrically connected to the sensor element 25, by means of sensor connection lines 31 embodied for instance as bonding wires. The closed-loop control circuit 30 serves the purpose of supplying the sensor element 25 and evaluating the electrical signals furnished by the sensor element 25. The layout of this kind of closed-loop control circuit 30 is well known to one skilled in the art and may be learned for instance from U.S. Pat. No. 4,777,820. The control circuit 30 has a number of electrical components, which are typically combined by the so-called hybrid technique into a hybrid circuit. The control circuit 30 is accommodated in a metal protective housing 34, which comprises a metal bottom housing 35 and a metal closure housing 50 that can be joined together. The hybrid circuit is applied to a hybrid substrate 17 as an integrated film circuit and in the exemplary embodiment is glued by means of an adhesive, for instance, to a top side 46 of a base wall 36, of rectangular shape, for instance, of the metal bottom housing 35.

The bottom housing 35, shown in a perspective detail view in FIG. 4 without the sensor element 25, can be made from a thin strip of metal, for instance a metal sheet; stamping, bending, folding, deep-drawing or swaging methods are suitable for machining the metal strip. The closure housing 50 may also be made from a metal strip by means of stamping, bending, folding, deep-drawing or swaging methods. The base wall 36 of the bottom housing 35 has an approximately rectangular shape, for instance, to the top 46 of which the hybrid substrate 17 is glued. Protruding from the longer sides of the rectangular base wall 36, each bent at right angles to it, are side walls 37 extending parallel to one another and serving to retain the metal closure housing 50 (FIG. 1) that can be inserted between the two side walls 37 of the bottom housing 35. On a bottom side 45 of the base wall 36, the bottom housing 35 has protruding stamped-out retaining tangs 41, for instance four in number, which on insertion of the bottom housing 35 into the base housing recess 16 of the base housing 15 engage correspondingly recessed holes 49 of the base housing 15, so as to secure the bottom housing 35 to the base housing 15, for instance in a plug-in fashion. Instead of or in addition to the retaining tangs 41 of the bottom housing 35, it is also possible for the bottom housing 35 to be glued to the base housing 15 by means of an adhesive.

As shown in FIG. 4, the bottom housing 35 has a tonguelike extension, on a short side of the rectangular base wall 36, which is embodied as a sensor carrier 27 for retaining the sensor element 25. The sensor carrier 27 and the bottom housing 35 may be made in a joint production process as shown in FIG. 4, or each individually; stamping, bending, folding, deep-drawing and swaging processes are suitable for this. After the sensor carrier 27 and the bottom housing 35 have been made individually, for instance, both parts can be joined again by suitable joining means, such as laser welding. The sensor carrier 27 is produced in each case by folding of a thin metal strip. In the exemplary embodiment shown in FIG. 4, an opening 62 is made, for instance by stamping, in the rectangular tonguelike extension of the base wall 36, centrally with respect to a longitudinal axis 11 of the protective housing. After that, in a bending axis located parallel to the longitudinal axis 11 of the protective housing, a portion of the tonguelike extension is bent in such a way that in the final state of the bent metal strip, approximately two equal-sized elements 56, 57 contact one another. The element bent out of one plane of the base wall 36 will hereinafter be referred to as the retaining element 57, and the unbent element, remaining in the plane and having the opening 62, will be called the frame element 56. The retaining element 57 extends below the bottom side 45. As shown in FIG. 5, which is a section taken along a line V—V of FIG. 4 with the sensor element 25 in place, the retaining element 57, in the approximately 180° fully bent state, covers the opening 62 of the unbent frame element 56, which together with the retaining element 57 defines a recess 58. The frame element 56, or the recess 58, has a cross section which is approximately equivalent to the platelike, for instance rectangular, shape of the sensor element 25 and has a depth t, which is greater than a thickness d measured crosswise to the flow 9 of the sensor element 25, so as to receive the sensor element 25 entirely within the recess 58. After the folding of the metal strip, the retaining element 57 is deformed by means of a tool, for instance a swaging tool, engaging an outer surface 61 of the retaining element 57, so that a deformed portion of a bottom surface 63, defined by the recess 58 of the frame element 56, of the retaining element 57 protrudes somewhat, in the form of a plateaulike protuberance 64, into the recess 58 of the frame element 56. The plateaulike protuberance 64 formed in the region of the opening 62 of the frame element 56 has a smaller cross section than a cross section of the opening 62 and of the sensor element 25 mounted on the protuberance 64. In the swaging operation it is also possible to make one or more adhesive beads 65 in the bottom face 63, which extend in groovelike fashion within the bottom face 63, for instance around the plateaulike protuberance 64. After that, for instance by swaging, a side face 67 of the sensor carrier 27, which face extends along the bending axis and toward the flow direction 9, is deformed in such a way that a leading edge 68, leading into the flow, which is rounded off around the bending axis and flattened toward the top face 59, is created. As a result of the rounded-off and optionally wedge-shaped leading edge 68, there is a uniform oncoming flow along the sensor element 25, in particular without eddies or regions of detachment at the surface 60 of the sensor element 25. An adhesive is applied to the plateaulike protuberance 64, onto which adhesive the sensor element 25 is placed in the recess 58 and by which the sensor element 25 is held outside its sensor region 26. In the gluing operation, any excess adhesive applied can collect in the recessed adhesive beads 65 in the bottom face 63, so that the sensor element 25 is glued with a constant thickness of the adhesive film to the plateaulike protuberance 64. Since the recessing of the plateaulike protuberance 64 does not take place until after the folding of the metal strip, it is also possible to make the protuberance with an extremely slight tolerance, so that the sensor element 25 can be glued with maximum precision into the recess 58, with its surface 60 flush with the surface 59 of the frame element 56. The embodiment of the plateaulike protuberance 64 is made such that the plateaulike protuberance 64 does not cover the sensor region 26 of the sensor element 25, and so the sensor element 25 is glued only outside its sensor region 26, as a result of which the sensor element 25 is accommodated in the recess 58 with its sensor region 26 free and not in contact with the bottom face 63. As a result, by means of an air cushion between the sensor element 25 and the bottom face 63, good thermal insulation of the sensor element 25 in the retaining element 57 is obtained. Moreover, the cross section of the recess 58 is dimensioned somewhat larger in the flow direction 9 than the cross section of the sensor element 25, so that an air gap is created between the sensor element 25 and the wall of the recess 58, which enables good thermal insulation of the sensor element 25 in the frame element 58. The height of the plateaulike protuberance 64 is chosen such that there is no shoulder between the surface 59 of the frame element 56 and the surface 60 of the sensor element 25.

For electrical connection of the hybrid circuit on the hybrid substrate 17 to an electrical plug connection 39 formed on the connection part 38 of the device 1, a plurality of connection lines 54 are provided, which as shown in FIG. 2 lead from the plug connection 39 to outside the bottom housing 35, with their ends forming contact points 43 in the base housing 15. By means of hybrid connection lines 52 bent in a U and embodied for instance by wires, the contact points 43 are connected electrically with corresponding contact points 42 of the hybrid substrate 17. The hybrid connection lines 52 are passed from outside through individual leadthrough capacitors 40 into the interior of the bottom housing 35 to the hybrid substrate 17 and are electrically contacted at their respective wire ends with the contact points 42 of the hybrid substrate 17 and the contact points 43 in the base housing 15, for example by means of soldering or laser welding. The individual leadthrough capacitors 40 are accommodated in intended openings in a common plug part 47 and are retained there, for instance by a soldered connection, and electrically connected to the plug part 47. For mounting of the plug part 47 in the bottom housing 35, spring elements 70, for instance two of them, are provided each on the side walls 37 of the bottom housing 35, between which spring elements the plug part 47 is pluggably introduced between the side walls 37 of the bottom housing 35, after which the plug part forms a metal front wall of the bottom housing 35 that faces toward the plug connection 39. The spring elements 70 are formed onto the side walls 37, pointing into the interior of the bottom housing 35, jointly in the production of the bottom housing 35 in a stamping and bending operation. In the production of the plug part 47, this part is equipped with the individual tubular leadthrough capacitors 40, after which the hybrid connection lines 52 are inserted into the leadthrough capacitors 40 and held and electrically contacted, for instance by a soldered connection. After that, the hybrid connection lines 42 can be bent into a U, so that in a simple way the plug part 47 is inserted as a separate plug-in module into the bottom housing 35 and held by the spring elements 70; a ground connection from the plug part 47 to the bottom housing 35 is produced by way of the spring elements 70. After the insertion of the plug part 47, the hybrid connection lines 52 can be electrically contacted, for instance by soldering or bonding, on their respective wire ends at the contact points 42 of the hybrid substrate 17 and at the contact points 43 in the base housing 15. From the contact points 43 provided in the base housing 15, the electrical connection lines 54 extend inside the base housing 15 to the plug connection 39, which in the exemplary embodiment is in the form of a plug connection by way of example. For electrical connection of the control circuit 30, an electric plug is mounted on the plug connection, which is connected to an electronic control unit, not shown, that evaluates the electrical signals furnished by the control circuit 30 so as to carry out engine power control for the internal combustion engine, for instance.

Figure 3:
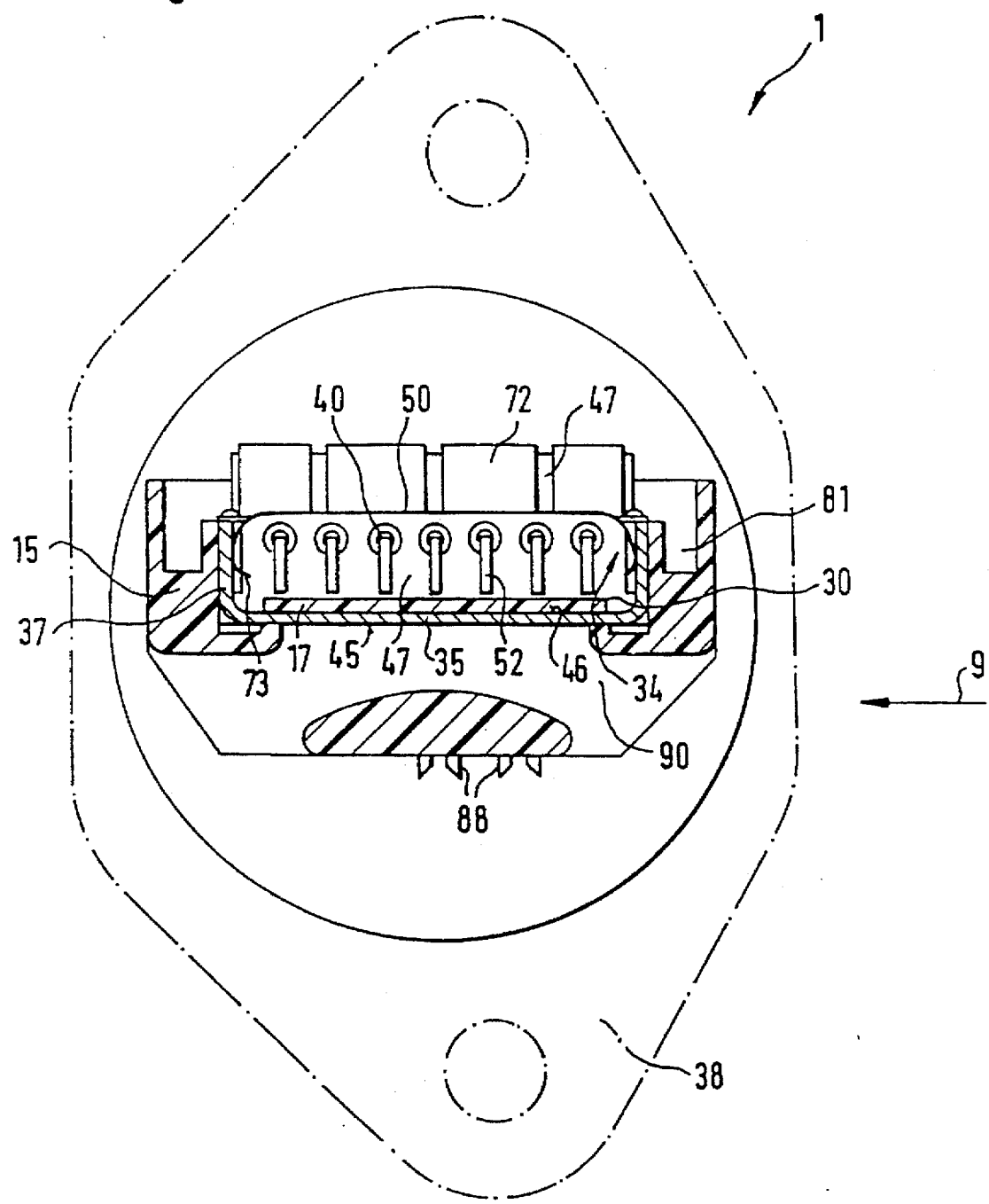
FIG. 3 is a section taken along the line III—III of FIG. 1.

The closure housing 50 is provided in order to cover the bottom housing 35 and the hybrid substrate 17, and as shown in FIG. 1 it fits around the plug part 47 with barette-like spring elements 72. The spring elements 72 only partly cover the front face 75 toward the plug connection 39 and a back face 76 toward the hybrid substrate 17, both faces pertaining to the plug part 47, in order by a resilient contact to obtain a ground connection from the closure housing 50 to the plug part 47 and from it via the spring elements 70 to the bottom housing 35. Moreover, the closure housing 50, on the two longer sides of its rectangular base surface 78, has two protruding side walls 79, which by way of example by means of multiple slits are subdivided into a plurality of spring elements 73. The spring elements 73 are spread outward somewhat, for example, in the production of the closure housing 50 so that in the installed state, as shown in FIG. 3, which is a sectional view along a line III—III, after the insertion of the closure housing 50 into the bottom housing 35, they rest resiliently against the side walls 37 of the bottom housing 35.

The protective housing 34 formed of the bottom housing 35, the closure housing 50 and by way of example the plug part 47, surrounds the hybrid circuits on all sides in order to protect the control circuit 30, especially against entering electromagnetic waves. The plug part 47 equipped with the leadthrough capacitors 40 assures that no electromagnetic waves will reach the hybrid circuit via the connection lines 54 and the hybrid connection lines 52 but will instead be filtered out by the leadthrough capacitors 40. Furthermore, by means of the metal bottom housing 35 and the metal closure housing 50, an emission of electromagnetic waves that could originate at the control circuit 30 is avoided, so that even electrical systems disposed in the immediate vicinity of the device 1 can function unaffected by the device 1. If optionally no such antidistortion provided by the leadthrough capacitors 40 is needed, then the plug part 47 can simply be omitted, without having to make expensive structural changes in the bottom housing 35. All that is necessary is that the contact points 43 in the base housing 15 and the contact points 42 of the hybrid substrate 17 be connected electrically to one another, for instance by bonding, soldering or laser welding.

For reasons having to do with soiling, the closure housing 50 is also covered by a cover 80 made of plastic, which as shown in FIG. 1 can be inserted for instance into a groove 81 of the base housing 35 that extends all the way around the base housing recess 16. The cover 80 is not shown in FIG. 2, for the sake of simplicity.

To compensate for the measured value of the sensor element 25 with respect to the temperature of the flowing medium, the device 1 has a resistor, hereinafter called the medium temperature resistor 86. The medium temperature resistor 86 is for example a part of the control circuit 30, which assures the changes in the temperature of the flowing medium cannot affect the measurement accuracy of the device 1. It is also possible, instead of or in addition to the electrical connection of the medium temperature resistor 86 to the control circuit 30, to contact the medium temperature resistor 86 separately from the plug mountable on the plug connection 39, by means of an electrical connection housing in the base housing 15 and an additional contact pin in the plug connection 39, so that the aforementioned plug can also be connected to other control circuits of the engine or to the electronic control unit. The temperature resistor 86 for measuring the medium has a resistance that is dependent on the temperature. The temperature resistor 86 may be embodied as an NTC (Negative Temperature Coefficient) or PTC (Positive Temperature Coefficient) resistor, and may for instance have a resistor in the form of a wire, film or foil. The temperature resistor 86 is disposed outside the measurement conduit 20 near an outer face 84 of the base housing 15 extending approximately parallel to the longitudinal axis 10, in a manner spaced apart from the outer face 84. The base housing 15, in the region of the temperature resistor 86, extends at right angles to the longitudinal axis 10 on its side toward the temperature resistor 86, only as far as the outer face 84. The temperature resistor 86 accommodated outside the base housing 15 has connection wires 92, 93, disposed side by side for purposes of electrical contacting, at least one of which, 93, is bent in a U such that it extends partly parallel to the other connection wire 92. The connection wires 92, 93 are secured, for instance by soldering, to two electrical retaining means 88, in the form of contact pins, and electrically connected to the connection wires 92, 93.

The retaining means 88 protrude, approximately opposite the plug part 47 of the bottom housing 35, from the outer face 80 of the base housing 35 into the flow cross section 12 and are located one after the other in the flow direction 9. For further retention of the temperature resistor 86, a plastic protrusion 89 projecting from the outer face 84 is provided on the base housing 15, and around it the at least one bent connection wire 93 extends in a groove on a side of the plastic protrusion 89 remote from the retaining 88, so that by means of the connection wires 92, 93, the temperature resistor 86 is disposed in the flowing medium, spaced apart from the outer face 84 of the base housing 15. Mounting the temperature resistor 86 outside the measurement conduit 20 on the base housing 15 offers the advantage that by spatial distancing of the temperature resistor 86 from the sensor element 25 on the one hand and from the hybrid circuit of the hybrid substrate 17 on the other, thermal influence on the temperature resistor 86 is precluded. In addition, the temperature resistor 86 outside the base housing 15 is not exposed to any influence from the flow that originates for instance at boundary walls of the measurement conduit 20, so that it can take on the temperature of the flowing medium unhindered.

As shown in FIG. 3, a cooling conduit 90 extending in the flow direction 9 is provided between the measurement conduit 20 and the plastic protrusion 89; it serves to cool the control circuit 30, and it further improves the thermal decoupling of the temperature resistor 86 from the sensor element 25 on the one hand and from the control circuit 30 on the other. The cooling conduit 90 extends approximately parallel to the flow direction 9 of the flowing medium, crosswise through the base housing 15; the underside 45 of the bottom housing 35 is partially freed of the plastic of the base housing 15. Because of the partly plastic-free underside 45, the heat given off by the control circuit 30 can be dissipated via the hybrid substrate 17 to the bottom housing 35 and to the cooling conduit 90, thus averting heating of the sensor element 25 and of the temperature resistor 86 by the heat given off by the control circuit 30. By way of example, the cooling conduit 90 has an approximately rectangular inlet cross section, which tapers in the flow direction 9 to a minimum cross section around the middle of the device 1 and then increases again in the flow direction 9, ending in a rectangular outlet cross section whose size matches the inlet cross section. Embodying the cooling conduit 90 in the form of a half-sided Laval nozzle in a certain sense has the effect that the flowing medium is accelerated from the inlet cross section to the underside 45 of the bottom housing 35, so as to increase the heat dissipation from the control circuit 30 to the flowing medium by means of an increased velocity at the underside 45 of the bottom housing 35.

The foregoing relates to preferred exemplary embodiments of the invention, it being understood that other variants and embodiments thereof are possible within the spirit and scope of the invention, the latter being defined by the appended claims.

We claim:

1. A sensor carrier for a device for measuring the mass of a flowing medium, in particular an aspirated air mass flowing medium of an internal combustion engine, having a sensor carrier and a platelike sensor element, introduced into the flowing medium, said sensor element has a sensor region with at least one temperature-dependent measuring resistor, wherein the sensor element is accommodated substantially flush in a recess of the sensor carrier and is held in the recess by, an adhesive, the sensor carrier (27) has two elements, a frame element (56) and a retaining element (57), which are disposed one above the other, the frame element (56) is provided with a through opening (62) which is directly covered by the retaining element (57), so that by means of the through opening (62) covered by the retaining element (57), a recess (58) for receiving the sensor element (25) is formed, and the sensor element (25) is secured on the retaining element (57) within the recess (58) by the adhesive.

2. The sensor carrier of claim 1, in which the sensor carrier (27) has a rounded or flattened leading edge (68) oriented counter to the flowing medium.

3. The sensor carrier of claim 1, in which the frame element (56) and the retaining element (57) are embodied in platelike fashion.

4. The sensor carrier of claim 1, in which the frame element (56) and the retaining element (57) are joined together by connecting means.

5. A sensor carrier for a device for measuring the mass of a flowing medium, in particular an aspirated air mass flowing medium of an internal combustion engine, having a sensor carrier and a platelike sensor element, introduced into the flowing medium, said sensor element has a sensor region with at least one temperature-dependent measuring resistor, wherein the sensor element is accommodated substantially flush in a recess of the sensor carrier and is held in the recess by an adhesive, the sensor carrier (27) has two elements, a frame element (56) and a retaining element (57), formed of metal which are disposed one above the other to communicate with each other via a bending axis, and an opening (62) is provided in the frame element (56) and covered by the retaining element (57), so that by means of the opening (62) covered by the retaining element (57), a recess (58) for the sensor element (25) is formed.

6. A sensor carrier for a device for measuring the mass of a flowing medium, in particular an aspirated air mass flowing medium of an internal combustion engine, having a sensor carrier and a platelike sensor element, introduced into the flowing medium, said sensor element has a sensor region with at least one temperature-dependent measuring resistor, wherein the sensor element is accommodated substantially flush in a recess of the sensor carrier and is held in the recess by an adhesive, the sensor carrier (27) has two elements, a frame element (56) and a retaining element (57), which are disposed one above the other, and an opening (62) is provided in the frame element (56) and covered by the retaining element (57), so that by means of the opening (62) covered by the retaining element (57), a recess (58) for the sensor element (25) is formed, and a bottom face (63) of the retaining element (57) has a protuberance (64) in a region of the opening (62) of the frame element (56.

7. The sensor carrier of claim 6, in which the protuberance (64) has a smaller cross section than a cross section of the opening (62) and of the sensor element (25) mounted on the protuberance (64).

8. The sensor carrier of claim 7, in which the sensor element (25), in a region outside a sensor region (26), is secured to the protuberance (64).

9. A sensor carrier for a device for measuring the mass of a flowing medium, in particular an aspirated air mass flowing medium of an internal combustion engine, having a sensor carrier and a platelike sensor element, introduced into the flowing medium, said sensor element has a sensor region with at least one temperature-dependent measuring resistor, wherein the sensor element is accommodated substantially flush in a recess of the sensor carrier and is held in the recess by an adhesive, the sensor carrier (27) has two elements, a frame element (56) and a retaining element (57), which are disposed one above the other, and an opening (62) is provided in the frame element (56) and covered by the retaining element (57), so that by means of the opening (62) covered by the retaining element (57), a recess (58) for the sensor element (25) is formed, and the sensor carrier (27) is part of a metal protective housing (34) of the device (1) in which said housing receives a control circuit (30).

* * * * *